United States Patent Office 2,877,211
Patented Mar. 10, 1959

2,877,211

SULFUR CONTAINING CURING AGENTS FOR SILICONE RESINS

Siegfried Nitzsche, Sebastian Reichstaller, and Manfred Wick, Burghausen, Upper Bavaria, Germany, assignors to Wacker-Chemie G. m. b. H., Munich, Germany No Drawing. Application November 12, 1954
Serial No. 468,534

Claims priority, application Germany November 18, 1953

7 Claims. (Cl. 260—46.5)

The present invention relates to methods of accelerating the cure of silicone resins and to the novel compositions embodying such a method.

The necessity for adding various curing agents or catalysts to silicone resins has been well recognized in the past. Curing agents such as metal salts of fatty acids or naphthenic acids, metal alcoholates, and metal chelates have been widely advocated and used in order to bring the curing time and temperature of silicone resins down to a commercially feasible level. The curing action of the known catalysts has been satisfactory. These catalysts, however, have had a detrimental effect upon the thermal stability of the cured silicone resin.

Thus, although it has been desirable for the consumer to employ curing catalysts in conjunction with the silicone resins, the shortened curing schedule made possible by such use has been obtained at the expense of other desirable properties of the resin.

The thermal stability of a silicone resin is generally determined by noting the time in which a resin film of given thickness, as for example a 0.1 mm. thick film, first shows the development of small cracks after aging at a given temperature, such as 250° C. The time required to bring about this thermal degradation is known as the "craze life" of the particular resin. Many silicone resin films which have been cured without the addition of a curing agent show no crazing after 300 hours at 250° C. Similar films containing 0.3 percent cobalt naphthenate as a catalyst craze in about 100 hours at 250° C., and when using 0.3 percent lead naphthenate such films craze in even a shorter time. Along with the decrease in thermal stability, resins containing the known curing agents tend to show a considerable decrease in adhesion to metals such as iron and cobalt.

It is an object of the present invention to provide improved curing agents for silicone resins which, when incorporated into the resins, will bring about the desired decrease in curing time and temperature but which will not have a detrimental effect upon the thermal stability and adhesive properties of the product. It is also an object of this invention to provide improved resinous compositions embodying such curing agents. Other objects and advantages will be apparent from the following description.

It has been found that when one uses, as a cure accelerator for silicone resins, an organic sulfur compound (preferably containing carbon bonded sulfur atoms) in which a sulfur bonded hydrogen atom is replaced by a metal, the resulting composition not only cures very rapidly but also has a considerably improved thermal stability and adhesion to metal surfaces. Examples of the preferred sulfur compounds from which the metal derivatives are formed are:

(1) Mercaptan type compounds having the formula RSH, where R is a monovalent hydrocarbon radical or the radical

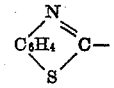

The hydrocarbon radicals can be, for example, alkyl, aryl, alkaryl, and aralkyl radicals. The preferred alkyl radicals are those of from 1 to 4 carbon atoms, and the phenyl radical is the preferred aryl radical.

(2) Thiosulfonic acid compounds having the general formula

where R' is a monovalent hydrocarbon radical, the preferred species of which are as illustrated in (1) above.

(3) Compounds of the formula

where X is oxygen or sulfur and Y is an R' radical or an —OR' radical (R' being as defined in (2) above) or a —NR''$_2$ radical where R'' is hydrogen or a monovalent hydrocarbon radical. When R'' is a hydrocarbon radical the preferred species are as illustrated in (1) above. It is preferred that at least one of the R'' radicals be a hydrocarbon radical. The thio acids, dithio acids, and thiolcarbamates fall within the scope of this type of compound.

The metal salts of the dithiol acids and their derivatives

and the thionthiol acids

are also useful in this invention.

Specific examples of preferred compounds are the metal salts of dithiocarbamic acids, xanthic acids, and mercaptans, e. g., metal salts of methyldithiocarbamic acid, ethyldithiocarbamic acid, propyldithiocarbamic acid, cyclohexylethyldithiocarbamic acid, phenyldithiocarbamic acid, tolyldithiocarbamic acid, dimethyldithiocarbamic acid, diphenyldithiocarbamic acid, ethylphenyldithiocarbamic acid, pentamethylenedithiocarbamic acid, methylxanthic acid, ethylxanthic acid, propylxanthic acid, phenylxanthic acid, methyl mercaptan, butyl mercaptan, propyl mercaptan, phenylmercaptan, tolyl mercaptan, naphthyl mercaptan, and mercapto-benzothiazole, and similar derivatives of the thio acids

dithio acids

and thiolcarbamates

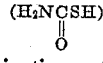

Any of the metal derivatives of the above described organic sulfur compounds, in which the metal has replaced a sulfur bonded hydrogen atom, are suitable for use in this invention. Particularly preferred are the zinc, cobalt, iron, nickel, copper, tin, and lead derivatives.

The amount of the defined curing agents employed can obviously vary over extremely wide ranges depending upon the particular results desired. Although large excesses can be used, there is obviously no particular need for employing any more catalyst than is necessary to reduce the curing time of a given silicone resin to whatever range might be desirable in the particular use contemplated for that resin. Thus there is rarely any need for more than 5 percent by weight of catalyst. Likewise there is no specific minimum amount of catalyst which must be employed, for the catalytic action will be obtained to a certain extent with any amount whatsoever. Ordinarily the best results are obtained by employing from about .01 to 2.0 percent by weight of the catalyst based upon the weight of the organopolysiloxane resin present, a particularly preferred amount being in the range of from 0.3 to 0.6 percent by weight of the catalyst.

All types of silicone resins can be employed in the present invention. Such resins are now well known and many are commercially available materials. These resins are polymers or copolymers or mixtures thereof which usually have the average general formula $$R'''_n SiO_{\frac{4-n}{2}}$$

where $n$ has an average value of from 1 to 1.7. The organic radicals, represented by $R'''$ in this formula, are usually alkyl, aryl, alkaryl, aralkyl, cycloaliphatic or heterocyclic radicals or halogenated derivatives of any of such radicals. The most common and commercially available silicone resins are those which contain methyl, ethyl, phenyl or chlorophenyl radicals and various combinations of such radicals. The silicone resins can contain structural units of the general formula $$R'''_x SiO_{\frac{4-x}{2}}$$

where $x$ is 0, 1, 2, or 3, the total distribution of such units being such that the average degree of substitution of the resin lies between about 1 and 1.7 organic radicals per silicon atom. Silicone resins, or fluids which are easily converted to the resinous state by the application of heat, which contain silicon bonded hydrogen atoms are also well known commercially-available materials and are within the scope of the silicone resins employed in this invention. Examples of the latter type of materials are the polymers and copolymers of methylhydrogenpolysiloxane which are well known in the art.

It is to be understood of course that the silicone resins described above often contain silicon bonded hydroxy radicals in varying amounts and the description of the polymeric units present is intended to include the polymers and copolymers which contain such hydroxy radicals. The silicone resins can also contain silicon atoms which are linked by divalent hydrocarbon radicals such as the methylene, ethylene, and phenylene linked materials which are known in the art.

The compositions of the present invention can contain any of the conventional silicone resin additives as long as the function of the catalyst is not seriously impaired by the presence of such additives. In other words, the presence of fillers, pigments, oxidation inhibitors, etc., is considered to be within the scope of the invention. A wide variety of organic solvents are employed with silicone resins, and any of such solvents can of course also be present.

The compositions of the present invention are useful as impregnating agents, molding compounds, laminating agents, and all of the other various uses for which silicone resins have become widely known and used. The thermal stability and electrical insulation properties of the silicone resins are of course well known.

The following examples are illustrative only.

EXAMPLE 1

A monomethyl-, dimethyl-, trimethylsiloxane copolymer having a $CH_3/Si$ ratio of about 1.5 was dissolved in toluene and mixed with the additives listed in Table I below. Films about 0.1 mm. in thickness were cast from the various mixtures. The films were heated at 250° C. until cured and then aged at 250° C. until the first evidence of any crazing developed. The table illustrates the degree to which the curing agents used in this invention improve the thermal stability of the silicone resin films as compared to conventional curing agents and as compared to a control sample containing no curing agent.

*Table I*

| Curing Agent | Film, mm. | Hrs. Curing Time, 250° C. | Craze Life, Hrs., 250° C. |
|---|---|---|---|
| Control | 0.11 | 24 | 264 |
| 0.2% Lead Naphthenate | 0.09 | 3 | 36 |
| 0.2% Zinc Stearate | 0.10 | 8 | 72 |
| 0.3% Cobalt Octoate | 0.09 | 6 | 48 |
| 0.05% Iron Acetylacetonate | 0.10 | 2 | 36 |
| 0.3% Cobalt Ethylxanthate | 0.12 | 4 | 336 |
| 0.4% Zinc Ethylphenyldithiocarbamate | 0.10 | 3 | 600 |
| 0.6% Zinc Phenylmercaptan | 0.10 | 3 | 432 |

EXAMPLE 2

When the resin of Example 1 is mixed with the cobalt, tin or lead salts of mercapto-benzothiazole, methyldithiocarbamic acid, cyclohexylethyl dithiocarbamic acid, ethylxanthic acid, or naphthyl mercaptan, an improvement in craze life similar to that illustrated in Example 1 is obtained.

EXAMPLE 3

A resinous silicone copolymer containing monomethylsiloxane units, monophenylsiloxane units, diphenylsiloxane units, and methylphenylsiloxane units in the form of a 50 percent by weight solution in toluene is mixed with .5 percent by weight of the zinc salt of phenyl mercaptan or the sodium salt of methylthiosulfonic acid. The resulting mixture is found to cure much faster at 200° C. than the copolymer without any additives. Films cast from the mixture are found to have a longer craze life than films from the same resin in which lead naphthenate is employed as the catalyst.

EXAMPLE 4

When trimethylsiloxy end-blocked methylhydrogenpolysiloxane is mixed with 0.3 percent by weight of the cobalt salt of ethylxanthic acid, or the zinc salt of ethylphenyldithiocarbamate, the curing time necessary at 150° C. to completely cure the resin is greatly reduced with little or no reduction in the thermal stability of the cured resin.

EXAMPLE 5

A resinous copolymer was prepared which consisted of 33.3 mol percent monophenyl-, 33.3 mol percent monomethyl-, and 33.3 mol percent phenylmethylsiloxane units. The resin baked at 250° C. within 18 hours. A resinous film of 0.1 mm. thickness on sheet iron showed the first cracks after 675 hours at 250° C. The resin was mixed with the curing agents listed in the following table and subsequently the baking time and the thermal stability were examined.

*Table*

| Curing Agent | Curing Time, Hrs. at 250° C. | Craze Life, 0.1 mm. film, Hrs. at 250° C. |
|---|---|---|
| None | 18 | 675 |
| 0.05% Zinc Octoate | 16 | 520 |
| 0.1% Zinc Octoate | 15 | 360 |
| 0.2% Zinc Octoate | 6 | 120 |
| 0.1% Zinc salt of mercapto-benzothiazole | 8 | 1,020 |
| 0.2% Fe salt of phenylthiosulfonic acid | 10 | 1,400 |
| 0.1% Cu-ethylxanthate+0.1% Zn-dimethyldithiocarbamate | 4 | 1,020 |

Further examples of salts which have given particularly good results in this invention are listed below in accordance with the type of organic sulfur compound they exemplify:

(a) Salts of thio acids:
Zn-thioacetate, K-thiobenzoate, Sn(II)-thiopropionate, Cu-thiosalicylate
(b) Salts of dithio acids:
Co-dithiocaprinate, Ca-dithioacetate, Fe-dithiobenzoate
(c) Salts of thiosulfonic acids:
Ni-thiosulfo-benzoate
(d) Salts of mercaptans:
Pb-benzylmercaptide, Zn-butylmercaptide
(e) Salts of xanthic acids:
K-ethylxanthate, Cu-phenylxanthate
(f) Salts of dithiocarbamic acids:
Zn-phenylmethyldithiocarbamate, Co-phenyldithiocarbamate.

As has been stated previously, the salts of any metal can be used. From an economical point of view, however, it is obvious that more common metals will be preferred. With regard to their effectiveness, the most common salts can be classified in an order of decreasing effectiveness as follows: Zn, Co, Fe, Ni, Cu, Sn, Pb, alkaline earth metals, alkali metals.

That which is claimed is:

1. A composition of matter comprising a mixture of an organopolysiloxane resin in which the polymeric units have the average general formula

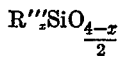

where R''' is a monovalent hydrocarbon radical free of aliphatic unsaturation and $x$ is an integer of from 0 to 3 inclusive, the average degree of substitution of said resin being from 1 to 1.7 monovalent hydrocarbon radicals attached to silicon by C—Si linkage per silicon atom, with from 0.01 to 2 percent by weight based upon the weight of the organopolysiloxane of an organic sulfur compound in which a sulfur bonded hydrogen atom is replaced by a metal, said organic sulfur compound being selected from the group consisting of (1) a mercaptan compound having the formula RSH, where R is selected from the group consisting of monovalent hydrocarbon radicals and the radical

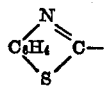

(2) a thiosulfonic acid having the general formula

where R' is a monovalent hydrocarbon radical, and (3) a compound of the formula

where X is selected from the group consisting of oxygen and sulfur atoms, and Y is selected from the group consisting of R' radicals, —OR' radicals, and —NR''$_2$ radicals, where R' is a monovalent hydrocarbon radical and R'' is selected from the group consisting of hydrogen atoms and monovalent hydrocarbon radicals, at least one R'' being a monovalent hydrocarbon radical.

2. A composition of matter comprising a mixture of an organopolysiloxane resin having the average general formula

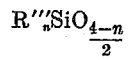

where R''' is selected from the group consisting of methyl and phenyl radicals and $n$ has an average value of from 1 to 1.7, with from 0.05 to 2 percent by weight based upon the weight of the organopolysiloxane of an organic sulfur compound in which a sulfur bonded hydrogen atom is replaced by a metal, said organic sulfur compound being selected from the group consisting of (1) a mercaptan compound having the formula RSH, where R is selected from the group consisting of monovalent hydrocarbon radicals and the radical

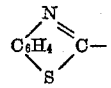

(2) a thiosulfonic acid having the general formula

where R' is a monovalent hydrocarbon radical, and (3) a compound of the formula

where X is selected from the group consisting of oxygen and sulfur atoms, and Y is selected from the group consisting of R' radicals, —OR' radicals, and —NR''$_2$ radicals, where R' is a monovalent hydrocarbon radical and R'' is selected from the group consisting of hydrogen atoms and monovalent hydrocarbon radicals, at least one R'' being a monovalent hydrocarbon radical.

3. A composition in accordance with claim 2 wherein the sulfur compound is zincdimethyldithiocarbamate.

4. A composition in accordance with claim 2 wherein the sulfur compound is the zinc salt of mercapto-benzothiazole.

5. A composition in accordance with claim 2 wherein the sulfur compound is cobaltphenyldithiocarbamate.

6. A composition in accordance with claim 2 wherein the sulfur compound is the iron salt of phenylthiosulfonic acid.

7. A composition in accordance with claim 2 wherein the sulfur compound is cobaltethylxanthate.

References Cited in the file of this patent
UNITED STATES PATENTS 2,442,059    Safford _____ May 25, 1948
2,713,564    Pfeifer et al. _____ July 19, 1955